Figure 4:
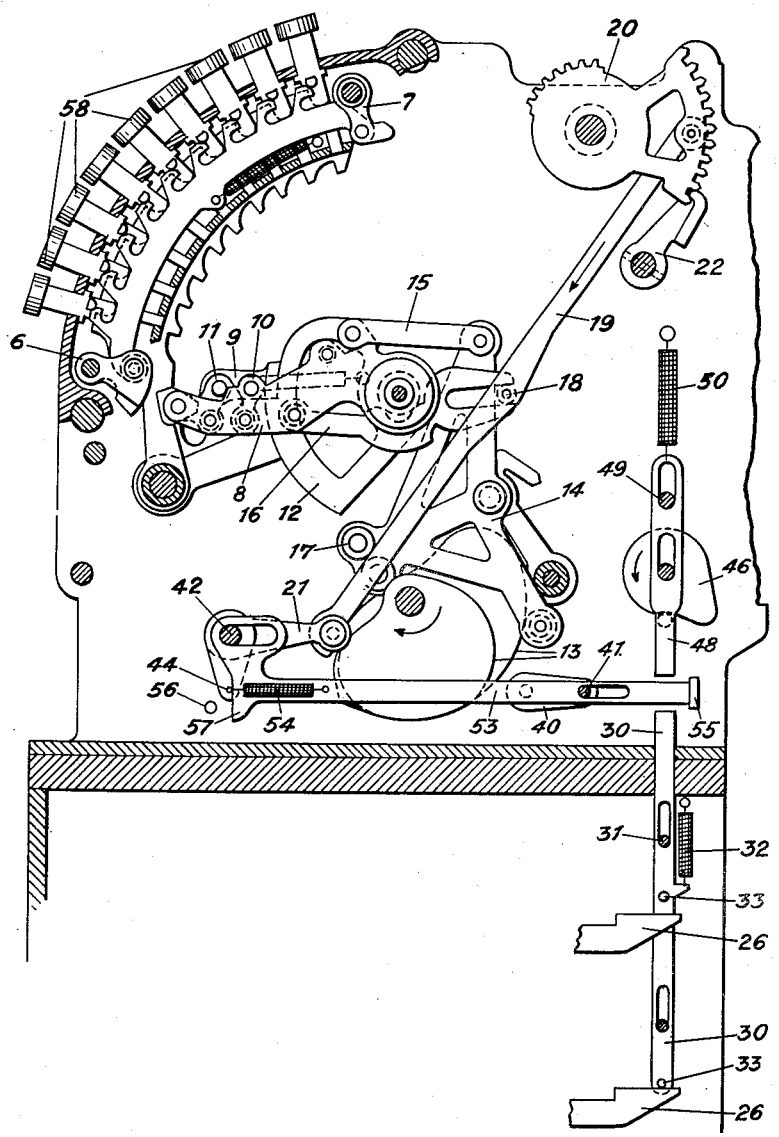

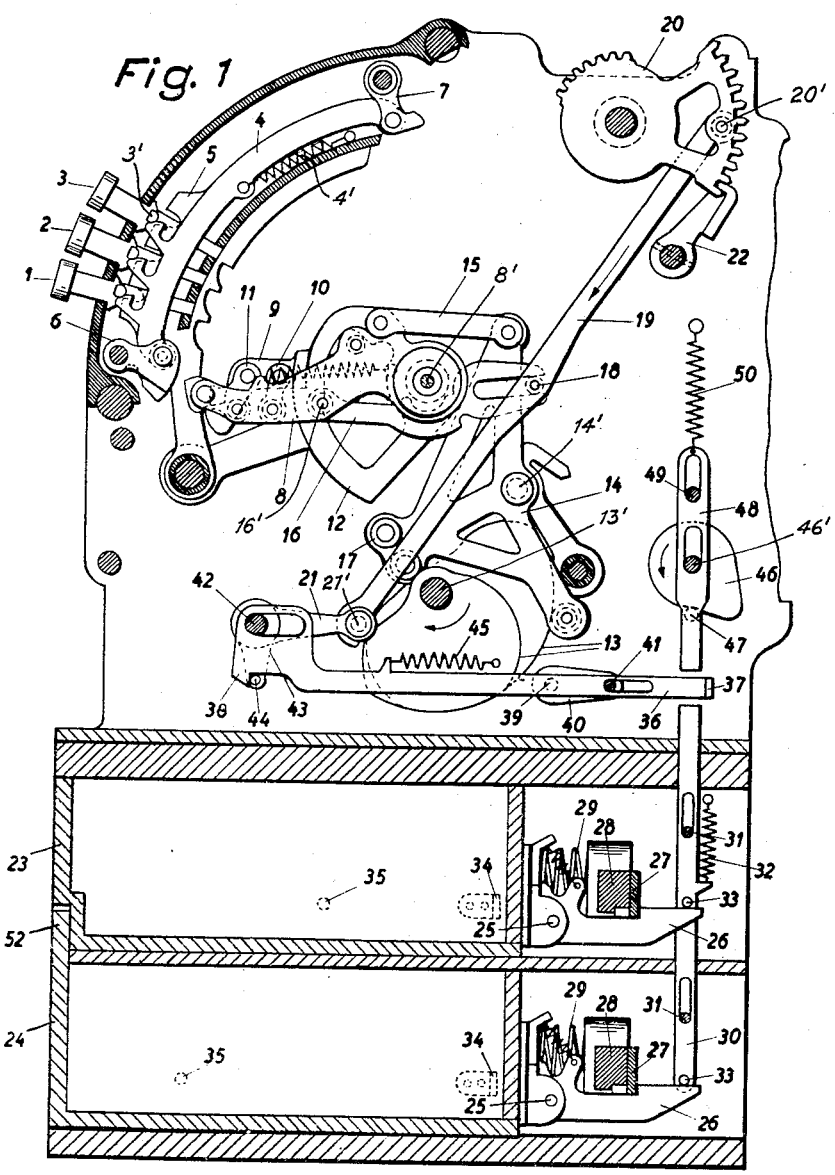

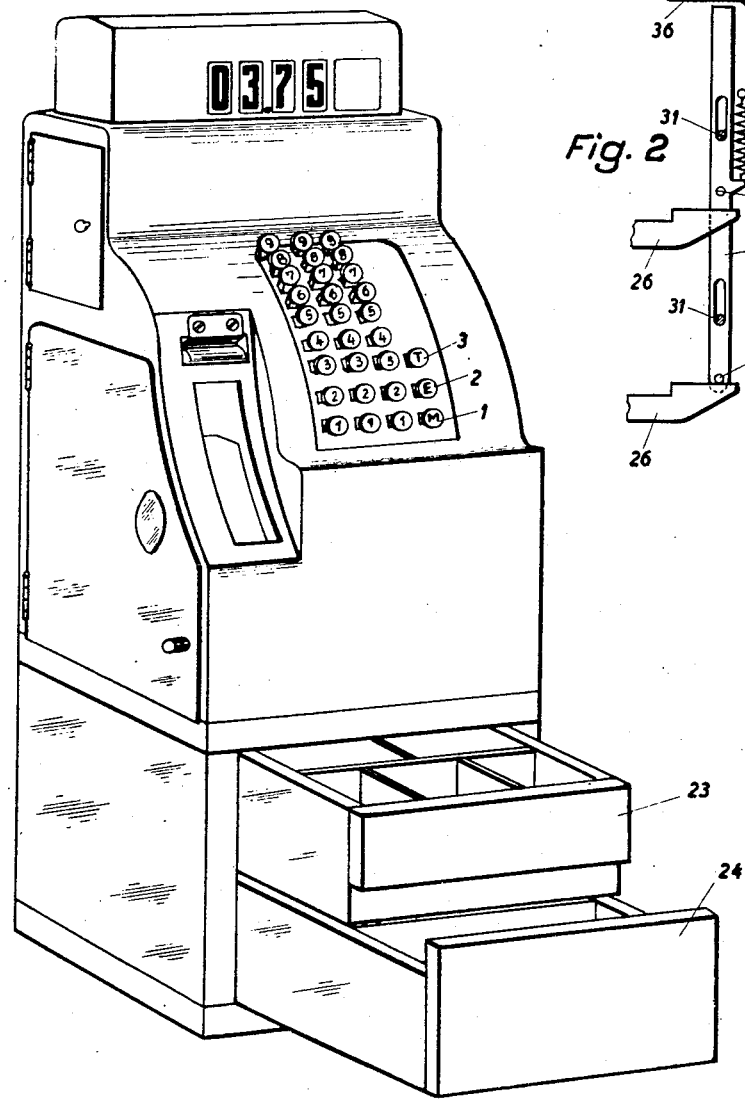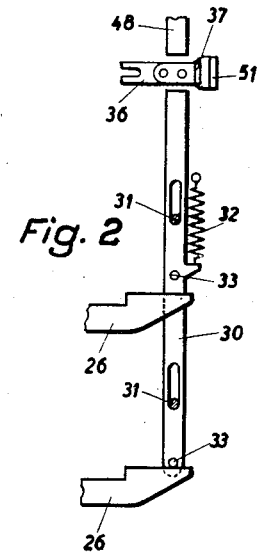

Aug. 25, 1953  K. AURBACH ET AL  2,650,023
PLURAL DRAWER MECHANISM FOR CASH REGISTERS
Filed Aug. 16, 1949  3 Sheets-Sheet 3

INVENTORS
Kurt Aurbach
Albert Klaar.
BY
Knight Bros
ATTORNEYS.

Patented Aug. 25, 1953

2,650,023

UNITED STATES PATENT OFFICE 2,650,023

PLURAL DRAWER MECHANISM FOR CASH REGISTERS

Kurt Aurbach and Albert Klaar, Bielefeld, Germany, assignors to Anker-Werke, A. G., Bielefeld, Germany, a corporation of Germany Application August 16, 1949, Serial No. 110,553
In Germany October 1, 1948

4 Claims. (Cl. 235—22)

1

The invention relates to cash registers and, more particularly, to the cash drawers and drawer control means of such registers.

The space available for a cash register is often extremely limited. Therefore, very small cash registers have been built. The customary cash drawer, however, cannot practicably be reduced to the smaller machine size because it would be too small for the collections of one business day. For that reason, the small-size cash registers have been equipped with an unproportionately large cash drawer. Since such a large drawer occupies more space than the register machinery proper, it severely limits or even obviates the intended space-saving advantage of the small machine design.

It is an object of the invention to provide drawer means for small cash registers whose useful cash capacity is not inferior to that of the normal size drawers but whose over-all space requirements are nevertheless adapted to the small machine dimensions.

According to a feature of the invention, a cash register is equipped with a plurality of vertically stacked cash drawers and these drawers are connected by latch control means with the amount set-up means or operation control mechanism of the cash register so that at least two drawers are opened in dependence upon the occurrence of predetermined selective machine operations, for instance, when an individual sales amount is registered or when a total is taken. With such a subdivision of a normal drawer into several smaller drawers of substantially equivalent total drawer capacity, the size of the drawer mechanism can readily be adapted to that of the small register machinery.

According to another feature of the invention, the individual money compartments for currency of the same or different respective denominations are removably disposed in the cash drawers and are exchangeable for compartments of different sizes.

These and more specific features of the invention are apparent from the drawing in which Fig. 1 shows a cross section through a cash register with drawer means according to the invention, Fig. 2 a modified detail of the locking mechanism for the drawers, Fig. 3 a perspective view of the cash register shown in Fig. 1, and Fig. 4 a cross section of another embodiment of a cash register according to the invention.

Aside from its numeral keys, the illustrated cash register is equipped with a bank of control keys 1, 2, 3 (Figs. 1, 3). Control key 1 serves for registering multiple sales items, key 2 for registering single items, and key 3 for totalling several multiple items. Two arcuate cam bars 4, 5 (Fig. 1) serve for blocking and releasing the keys 1, 2, 3. The cam bars 4, 5 are carried by arms of which those for bar 4 are visible in Fig. 1 and denoted by 6 and 7. Each cam bar is biased toward the illustrated position by a spring 4'. When one of the control keys is depressed by the operator, for instance key 3, a cross pin 3' of the key coacts with a cam face of cam bar 4 and moves it downwardly. When the key reaches its fully depressed position, the pin 3' enters into a cam recess and spring 4' pulls the cam bar upwardly and latches the key 3 in the depressed position while blocking the keys 1 and 2. The lower end of key 3 now projects toward the control mechanism described below and acts as a stop for the control mechanism. During the subsequent machine operation, bar 5 moves upwardly and releases the depressed key.

The control mechanism adjusted by the control keys comprises an adjusting member 8 pivoted on a shaft 8', a coupling member 9, coupled with member 8 by two links 10 and 11, and a drive member 12 which is actuated in a known manner through lifting cams 13 of the main drive shaft 12' through a drive lever 14 pivoted at 14' and a link 15. A fork member 16 is revolvably mounted on a pin 16' of the adjusting member 8. The bifurcated portion of member 16 straddles a roller 18 pivoted on a rod 19 which is engaged by a roller 17 of drive lever 14. Member 16 causes the rod 19 to be displaced in accordance with the adjustment of the adjusting member 8. Rod 19 is linked at 20' to a spur segment 20 for adjusting the indicating device of the cash register and is also linked at 21' to an arm 21 for correspondingly adjusting the type wheels of the appertaining printing device. A detent 22 engages the segment 20 to secure it in the adjusted position.

According to Figs. 1 and 3, the cash register has two cash drawers 23 and 24. These drawers are controlled by the actuation of the control keys 1, 2, 3. The drawers are normally locked in closed position by respective spring-biased latches 26 which are pivoted at 25. The latch 26 of each drawer catches behind a rail 27 mounted on a cross bar 28. Respective pressure springs 29 between the rear wall of each drawer and the appertaining cross bar 28 eject the drawer when the latch 26 is released. The release is controlled by a vertical slider 30 guided by pins 31. A spring 32 biases the slider 30 toward the normal position shown in Fig. 1. Two pins 33 on slider 30 are engageable with the latches 26 respectively. Two stops 34 mounted on the respective drawers 23 and 24 coact with stationary pins 35 to limit the opening movement of the drawers.

The operation of slider 30 is controlled by a horizontal slide bar 36. One end of bar 36 is angularly bent to form a lug 37. The other end of bar 36 is designed as a hook 38. Slide bar 36 is guided by a pin 41 which is mounted on an arm 40 pivoted at 39. Bar 36 is further guided by a shaft 42. Shaft 42 passes through an elongated hole of the bar and carries the abovementioned arm 21 as well as an arm 43. A pin 44 on arm 43 is engageable by the hook 38 of slide bar 36. A spring 45 biases the bar 36 toward the normal position shown in Fig. 1. The force for actuating the vertical slider 30 is provided by the drive mechanism of the cash register. A shaft 46' of this mechanism carries a lifting cam 46 to cooperate with a follower pin 47 on a slider 48 which is guided by a pin 49. A spring 50 biases the slider 48 upwardly to hold pin 47 against the lifting cam 46.

The described apparatus operates as follows:

If a multiple item is to be registered, the operator—after setting up the amount of the item at the amount key board, depresses the control key 1. This releases the control mechanism of the machine for operation so that the main shaft 13' and the cam shaft 46' turn one revolution. The lifting cams 13 of the main shaft 13' turn the lever structure 14 clockwise about shaft 14' so that the drive member 12, through link 15, is also turned clockwise about shaft 8'. The adjusting member 8 follows this movement but only until its stop abuts against the lower end of the depressed control key 1. Consequently, the rod 19 is displaced by fork member 16 a correspondingly limited extent (one step) and adjusts the gear sector 20 of the indicator and the shaft 42 of the printing device to register the item while the machine drive is active to indicate and print the amount of the item. Despite the operation of the indicating and printing devices, the horizontal slide bar is prevented from moving its angular end 37 into the path of the vertical slider 48 because the limited movement of the arm 21 is insufficient to permit such a slider displacement. Consequently, the slider 48, when being moved downwardly by cam 46, cannot engage the lug 37 of bar 36 and has no effect on the slider 30. Hence, the two cash drawers remain locked when multiple items are registered.

When several multiple items are to be totalized, or when single items are to be registered, either key 2 or the total key 3 is to be depressed. Now, the horizontal slider 36 is moved sufficiently to the left to place its lug 37 into the path of the vertical slider 48. When near the end of the machine operation the slider 48 moves downward, it displaces by means of lug 37 the slider 30 so that the latches 26 are unlocked and the drawers 23, 24 released. The springs 29 now drive the drawers open until the stops 34 abut against the stationary pins 35.

Fig. 2 shows a modification of the latch controlling sliders. In this modification, the horizontal slide bar 36 has an angular lug 51 in addition to lug 37. The two lugs are spaced from each other in the displacement direction of the slide bar 36 so that only lug 37 lies between the vertical sliders 48 and 30 when the slide bar moves one step to the left, while the lug 51 moves between the vertical sliders when slide bar 36 travels two steps toward the left. Lug 51 is vertically wider than lug 37. In further distinction from the first described embodiment, the cross pins 33 of the slider 30 are differently spaced from the respective latches 26, the upper pin 33 having a larger distance from the appertaining latch than the lower pin. The modified device operates as follows. When multiple sales items are registered, both drawers remain locked as in the first described embodiment. When single sales items are registered, i. e. when control key 2 (Figs. 1, 3) is depressed, the slide bar 26 moves only its lug 37 between the sliders 48 and 30. The downward movement then imparted by slider 48 to slider 30 through lug 37 causes the lower cross pin 33 to release the lower latch 26 (Fig. 2) but is insufficient to bring the upper cross pin into active engagement with the under latch. Consequently, only the lower drawer 24 is released and opened. When several sales items are totaled, i. e. when the total key 3 is depressed, the slide bar 26 moves farther to the left and places the wider lug 51 between the sliders 48 and 30. As a result, the slider 48 depresses the slider 30 through lug 51 to a correspondingly larger extent so that first the lower pin 33 and then the upper pin 33 release the respective latches 26. Hence, both drawers are now opened to take care of the fact that totalized amounts are usually larger than those of individual sales items.

The drawers may be returned to the closed position either singly or jointly. A projecting ledge 52 on drawer 24 entrains the drawer 23 for a joint return.

In order to permit using the entire space of the drawer 23, the appertaining stop in 35 may be spaced from the stop 34 the same amount as the pin appertaining to the drawer 24. If desired, the stop pin 35 for drawer 23 may be made controllable by means accessible only to authorized persons so that the rear portion of the drawer serves as a secret compartment which can be opened only by these persons.

If desired, the release of drawer 23 may be controlled so that this drawer opens only when larger amounts are registered. To this end, the angular lug 51 is mounted on a slider separate from slide bar 36 and controlled, for instance, by the amount keys of the key bank for the tens digit of the amount to be registered as is the case in the embodiment shown in Fig. 4 and described presently.

The cash register shown in Fig. 4 is similar to that of Figs. 1 and 3, the elements denoted in Fig. 4 by reference numerals between 6 and 42 being similar to those denoted in Fig. 1 by the same respective numerals. In contrast to the first described embodiment, however, the cash drawers of the machine are controlled by the keys for the ten-dollar digit of the amount to be registered, and these keys are therefore shown in Fig. 4. To secure such a control, and in distinction from the embodiment of Fig. 1, the pin 44 of arm 21 holds one end of a spring 54 whose other end is secured to a pin of the horizontal slide bar 53. Bar 53 has a nose 57 engageable with a stationary stop pin 56. Stop pin 56 permits slide bar 53 to move from the illustrated position toward the left only to the extent needed to place the angular lug 55 of slide bar 53 between the vertical sliders 30 and 48. Consequently, whenever the amount to be registered reaches a sufficient value to require the depression of a key of the tens-digit dollar bank, the lug 55 is moved into its drawer-opening coupling position and is held in that position by the stop pin 56 regardless of the value of this tens digit.

It will be apparent to those skilled in the art upon a study of this disclosure that devices according to the invention can be modified in various respects and may be designed differently from those specifically illustrated and described without departing from the objects and features of the invention and within the scope of the claims annexed hereto.

We claim:

1. A cash register, comprising selectively settable operation control means for registering respectively different kinds of transactions, a plurality of cash drawers biased to open and having respective latch devices for holding said drawers closed, a movable release member biased to a given position in which said drawers are latched and having a plurality of means engageable with and differently spaced from said latching devices so as to release one or more of said latching devices dependent upon the amount of movement of said release member from said given position, a drive member spaced from said release member, and a coupling member displaceable from a rest position to two operative positions, said coupling member having two coupling elements disposed between said drive member and said release member to transmit releasing motion from said drive member to said release member when said coupling member is in one of said respective operative positions, said coupling elements having respectively different dimensions to move said release member different respective amounts, and means disposed between said coupling member and said operation control means for selectively displacing said coupling member to said operative positions dependent upon the selected setting of said operation control means.

2. A cash register, comprising selectively settable operation control means for registering respectively different kinds of transactions, a plurality of vertically stacked cash drawers biased to open and having respective latching devices for holding said drawers closed, an elongated vertical slider vertically displaceable and biased to a given position in which said drawers are latched, said slider having a plurality of vertically aligned means differently spaced from said respective latching devices for sequentially engaging said devices during displacement of said slider so that the number of simultaneously released drawers depends upon the amount of displacement of said slider, a vertically movable driver spaced from and aligned with said slider and having a given stroke of movement, a coupling member horizontally displaceable between said driver and said slider to transmit from said driver to said slider a portion of the stroke movement dependent upon the horizontal displacement of said coupling member, and a mechanism disposed between said coupling member and said operation control means for displacing said coupling member different amounts depending upon the selected setting of said operation control means.

3. In a cash register according to claim 2, said operation control means comprising a keyboard having banks of numeral keys for the respective digits of amounts to be registered, and said mechanism having a movable member controlled by said numeral keys of one of said banks for a given high digit to displace said coupling member an amount needed for releasing a given plurality of said drawers only when the amount set up on said keyboard exceeds a given minimum.

4. A cash register, comprising selectively settable operation control means, a plurality of cash drawers biased to open and having respective latch devices for holding said drawers closed, a displaceable slider biased to a given position and engageable with said respective latch devices for releasing said drawers, a driver movable in the displacement direction of said slider and being spaced from said slider in said direction, a coupling structure displaceable from a rest position to an active position between said slider and said driver, said coupling structure when in said active position being engageable with said driver and with said slider to then transmit motion from said driver to said slider whereby said slider during operation of said driver is displaced an amount sufficient for releasing said plurality of drawers, and a mechanism connecting said coupling means with said operation control means for displacing said coupling structure in dependence upon a given setting of said control means.

KURT AURBACH.
ALBERT KLAAR.

References Cited in the file of this patent

UNITED STATES PATENTS

| Number | Name | Date |
| --- | --- | --- |
| 616,866 | Bockhoff | Dec. 27, 1898 |
| 1,520,727 | Sippert | Dec. 30, 1924 |
| 1,636,747 | Kreider | July 26, 1927 |
| 1,814,009 | Shipley | July 14, 1931 |
| 1,930,434 | Sherman et al. | Oct. 10, 1933 |
| 2,098,486 | Clark | Nov. 9, 1937 |
| 2,143,292 | Wheelbarger | Jan. 10, 1939 |

FOREIGN PATENTS

| Number | Country | Date |
| --- | --- | --- |
| 257,431 | Germany | Mar. 7, 1913 |
| 486,846 | Germany | Nov. 26, 1929 |
| 514,920 | Great Britain | Nov. 21, 1939 |